United States Patent
Fleischman et al.

(10) Patent No.: US 11,061,883 B2
(45) Date of Patent: Jul. 13, 2021

(54) AUTOMATED SOCIAL MESSAGE STREAM POPULATION

(71) Applicant: Twitter, Inc., San Francisco, CA (US)

(72) Inventors: Michael Ben Fleischman, Somerville, MA (US); Matthew Miller, Malden, MA (US); Richard Douglas Whitcomb, Jr., Winchester, MA (US); Mark Watabe, Cambridge, MA (US); Anthony Sciola, Somerville, MA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/792,086

(22) Filed: Feb. 14, 2020

(65) Prior Publication Data

US 2020/0183907 A1     Jun. 11, 2020

Related U.S. Application Data

(63) Continuation of application No. 16/004,897, filed on Jun. 11, 2018, now Pat. No. 10,565,180, which is a (Continued)

(51) Int. Cl.
*G06F 16/23* (2019.01)
*H04L 12/58* (2006.01)
(Continued)

(52) U.S. Cl.
CPC ............ *G06F 16/23* (2019.01); *G06F 3/0482* (2013.01); *G06Q 10/10* (2013.01); *H04L 51/02* (2013.01);
(Continued)

(58) Field of Classification Search
CPC ......... H04L 51/02; H04L 51/16; H04L 51/32; G06Q 10/10; G06Q 50/01; G06Q 30/0255; G06F 16/23
See application file for complete search history.

(56) References Cited

U.S. PATENT DOCUMENTS 6,987,221 B2 * 1/2006 Platt ..................... G10H 1/0058
                                                      84/601
8,825,759 B1 * 9/2014 Jackson .................. H04L 67/02
                                                      709/204
(Continued)

FOREIGN PATENT DOCUMENTS

KR       10-2013-0012180          2/2013

OTHER PUBLICATIONS

Barragáns-Martínez et al. "A hybrid content-based and item-based collaborative filtering approach to recommend TV programs enhanced with singular value decomposition," Information Sciences vol. 180, Issue 22, Nov. 15, 2010, pp. 4290-4311.

(Continued)

*Primary Examiner* — John M MacIlwinen
(74) *Attorney, Agent, or Firm* — Fish & Richardson P.C.

(57) ABSTRACT

A messaging system automatically populates a stream of messages using only a seed selected by the requesting account holder. In one embodiment, the seed includes the streams of one or more of the "top" accounts of the messaging system. Here, "top" is according to any one of a number of different metrics stored in the messaging system. With knowledge of the seed, the messaging system automatically populates a stream for the requesting account holder, without requiring any other input. As a result, an account holder is provided with a fully functioning stream with very little effort or knowledge required on their part.

21 Claims, 6 Drawing Sheets

Related U.S. Application Data continuation of application No. 14/621,203, filed on Feb. 12, 2015, now Pat. No. 9,996,575.

(60) Provisional application No. 62/072,638, filed on Oct. 30, 2014.

(51) Int. Cl.
    *G06F 3/0482*     (2013.01)
    *G06Q 10/10*     (2012.01)
    *G06Q 50/00*     (2012.01)

(52) U.S. Cl.
    CPC .............. *H04L 51/16* (2013.01); *H04L 51/32* (2013.01); *G06Q 50/01* (2013.01)

(56) References Cited

U.S. PATENT DOCUMENTS

| | | |
|---|---|---|
| 9,171,089 B2 | 10/2015 | Gross |
| 9,996,575 B2 | 6/2018 | Fleischman et al. |
| 1,056,518 A1 | 2/2020 | Fleischman et al. |
| 2005/0171799 A1 | 8/2005 | Hull et al. |
| 2008/0114755 A1 | 5/2008 | Wolters et al. |
| 2011/0072035 A1 | 3/2011 | Gaucas et al. |
| 2012/0117475 A1 | 5/2012 | Lee et al. |
| 2012/0124139 A1 | 5/2012 | Dempski |
| 2012/0179751 A1 | 7/2012 | Ahn et al. |
| 2012/0323928 A1 | 12/2012 | Bhatia |
| 2014/0068465 A1 | 3/2014 | Zhang et al. |
| 2014/0108432 A1 | 4/2014 | Fan et al. |
| 2014/0108562 A1 | 4/2014 | Panzer |
| 2014/0207818 A1 | 7/2014 | Jellick et al. |
| 2014/0222703 A1 | 8/2014 | Smith |
| 2014/0222913 A1 | 8/2014 | Cathcart et al. |
| 2014/0223099 A1* | 8/2014 | Kidron ................ G06F 12/0806 711/118 |
| 2014/0280329 A1 | 9/2014 | Beechuck et al. |
| 2014/0330794 A1 | 11/2014 | Dellenbach et al. |
| 2015/0286646 A1* | 10/2015 | Gross .................. G06F 16/3322 707/722 |
| 2016/0124925 A1 | 5/2016 | Fleischman et al. |
| 2018/0357265 A1 | 12/2018 | Fleischman et al. |

OTHER PUBLICATIONS

Chan et al. "Autonomic Ranking and Selection of Web Services by Using Single Value Decomposition Technique," Web Services, 2008. ICWS '08. IEEE International Conference, Sep. 2008, pp. 661-666.

Extended European Search Report issued in European Application No. 15856087.0, dated Jun. 26, 2018, 8 pages.

PCT International Search Report and Written Opinion, PCT Application No. PCT/US2015/051711, dated Dec. 23, 2015, 13 pages.

* cited by examiner

AUTOMATED SOCIAL MESSAGE STREAM POPULATION

CROSS REFERENCE TO RELATED APPLICATIONS

This application is a continuation of U.S. patent application Ser. No. 16/004,897, filed Jun. 11, 2018, now U.S. Pat. No. 10,565,180, which is a continuation of U.S. patent application Ser. No. 14/621,203, filed Feb. 12, 2015, now U.S. Pat. No. 9,996,575, which claims the benefit of U.S. Provisional Application Ser. No. 62/072,638, filed Oct. 30, 2014, which is incorporated by reference in its entirety.

BACKGROUND

The disclosure generally relates to messaging systems, and particularly to automatic generation of social message stream content.

There are a wide range of messaging systems that allow account holders to exchange, broadcast, or multicast messages. These messaging systems also provide ways for account holders to view messages created by others, as well as respond to those messages. Often these messaging systems are time sequenced, with the most recent messages appearing first, interest sequenced, with the messages of greatest interest to the account holder appearing first, or some combination thereof.

Generally, the messaging system provides each account holder with a personal platform for publishing and receiving messages. In some systems, this personalized platform categorizes messages into one or more streams of messages where the account holder chooses which messages appear in any given stream. Typically, there are a few different ways an account holder can include a message in one of their streams. Account holders can create a new message themselves, and they can copy (or repost) some or all of a message that has appeared in another account's stream. A messaging system may also allow this selection process to occur at the account level, such that an account holder can choose to receive in a stream all of the messages published by another account holder.

Using these mechanisms, these messaging systems allow an account holder to infinitely curate their streams to include only those messages they want to receive. For those account holders, allowing such fine-tuning provides major advantages, as once a stream has been set up, from then on the messaging system will automatically populate the stream with whatever messages they have indicated they wish to receive.

However, curating a message stream is a daunting task for a new or inexperienced account holder. Manually removing messages and account holders from a stream takes time and effort. Merely identifying that potential accounts of interest for a user is not a trivial task, and search functions that identify messages or accounts require sophisticated logic to work correctly, and still requires input on the part of the account holder to be used to their full effect. Often, new or inexperienced account holders are uninterested in the messaging system because the amount of time and effort required to make their own personalized streams reflect their interest outweighs their ability or interest to curate it as desired.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Configuration Overview

A messaging system includes a feature of automatically populating a stream of messages using only a seed selected by the requesting account holder. In one embodiment, a seed includes the streams of one or more of the "top" accounts of the messaging system. Here, "top" is according to any one of a number of different metrics stored in the messaging system. With knowledge of the seed, the messaging system automatically populates a stream for the requesting account holder, without requiring any other input. As a result, an account holder is provided with a fully functioning stream with very little effort or knowledge required on their part.

The automatically populated stream makes it easier for new or inexperienced account holders of the social messaging system to create robust streams full of content without requiring the time or effort normally required to manually curate a stream to include such content. That said, the automatically populated stream serves as a starting point, such that the account holder can further curate the stream to include or exclude messages they want to include in the stream. The automatically populated stream serves as an example of what a robust stream looks like, so an account holder can quickly see the value of the messaging system. Additionally, even for experienced account holders automatically populating a stream provides a new way for an account holder to receive a totally new stream right away includes different kinds of messages from what they were receiving previously, again with only minimal effort required on their part.

II. Computing Environment

Figure 1:
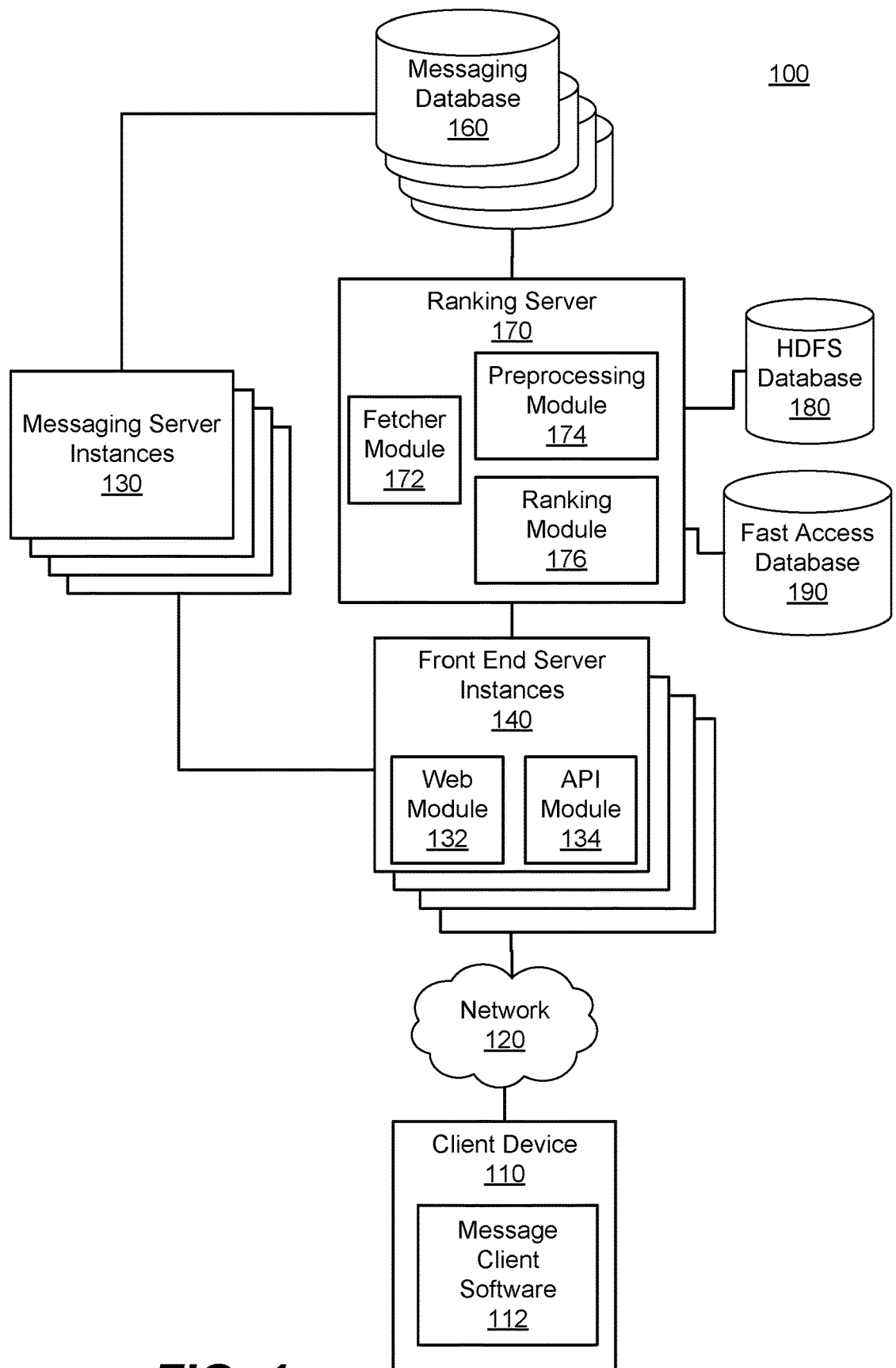
FIG. 1 illustrates the computing environment of computing devices for determining the messages to include in a stream, according to one embodiment.

FIG. 1 illustrates the computing environment of computing devices for determining the messages to include in a stream, according to one embodiment. The environment includes a client device 110, a network 120, a front end server 140, a number of messaging server instances 130, a database 160, a ranking server 170, a high density file system (HDFS) database 180, and a fast access database 190.

Account holders use client devices 110 to access the messaging system in order to publish messages and view and curate their streams. A client device 110 is a computer including a processor, a memory, a display, an input device, and a wired and/or wireless network device for communicating with the front end server 140 of the messaging system over network 120. For example, a client device 110 may be a desktop computer, a laptop computer, a tablet computer, a smart phone, or any other device including computing functionality and data communication capabilities.

The processor of the client device 110 operates computer software 112 configured to access the front end server 140 of the messaging system so that the account holder can publish messages and view and curate their streams. The software 112 may be a web browser, such as GOOGLE CHROME, MOZILLA FIREFOX, or MICROSOFT INTERNET EXPLORER. The software 112 may also be a dedicated piece of software designed to work specifically with the messaging system. Generally, software 112 may also be a Short Messaging Service (SMS) interface, an instant messaging interface, an email-based interface, an API function-based interface, etc.

The network 120 may comprise any combination of local area and/or wide area networks, the internet, or one or more intranets, using both wired and wireless communication systems.

The messaging system generally provides account holders with the ability to publish their own messages and view messages authored by other accounts. Messages may take of variety of forms including, digital text, videos, photos, web links, status updates, blog entries, tweets, profiles, and the like. The messaging system may also provide various complementary services such as those provided by social networks, blogs, news media, forums, user groups, etc. Examples of messaging systems include FACEBOOK and TWITTER. The messaging system is a distributed network including multiple computing devices, where each computing device in the system includes computer hardware specifically chosen to assist in the carrying out of its specific purpose.

Client 110 interface with the messaging system through a number of different but functionally equivalent front end servers 140. The front end server 140 is a computer server dedicated to managing network connections with remote clients 110. As the messaging system may have many millions of accounts, there may be anywhere from hundreds of thousands to millions of connections being established or currently in use between clients 110 and the front end server 140 at any given moment in time. Including multiple front end servers 140 helps balance this load across multiple countries and continents.

The frontend server 140 may provide a variety of interfaces for interacting with a number of different types of clients 110. For example, when an account holder uses a web browser 112 to access the messaging system, a web interface module 132 in the front end server 140 can be used to provide the client 110 access. Similarly, when an account holder uses an API-type software 112 to access the messaging system, an API interface module 134 can be used to provide the client 110 access.

The front end server 140 is further configured to communicate with the other backend computing devices of the messaging system. These backend computing devices carry out the bulk of the computational processing performed by the messaging system as a whole. The backend computing devices carry out any functions requested by a client 110 and return the appropriate response/s to the front end servers 140 for response to the client 110.

The backend computing devices of the messaging system include a number of different but functionally equivalent messaging servers 130. The messaging servers 130 are described immediately below with respect to FIG. 2.

III. Messaging Server

Figure 2:
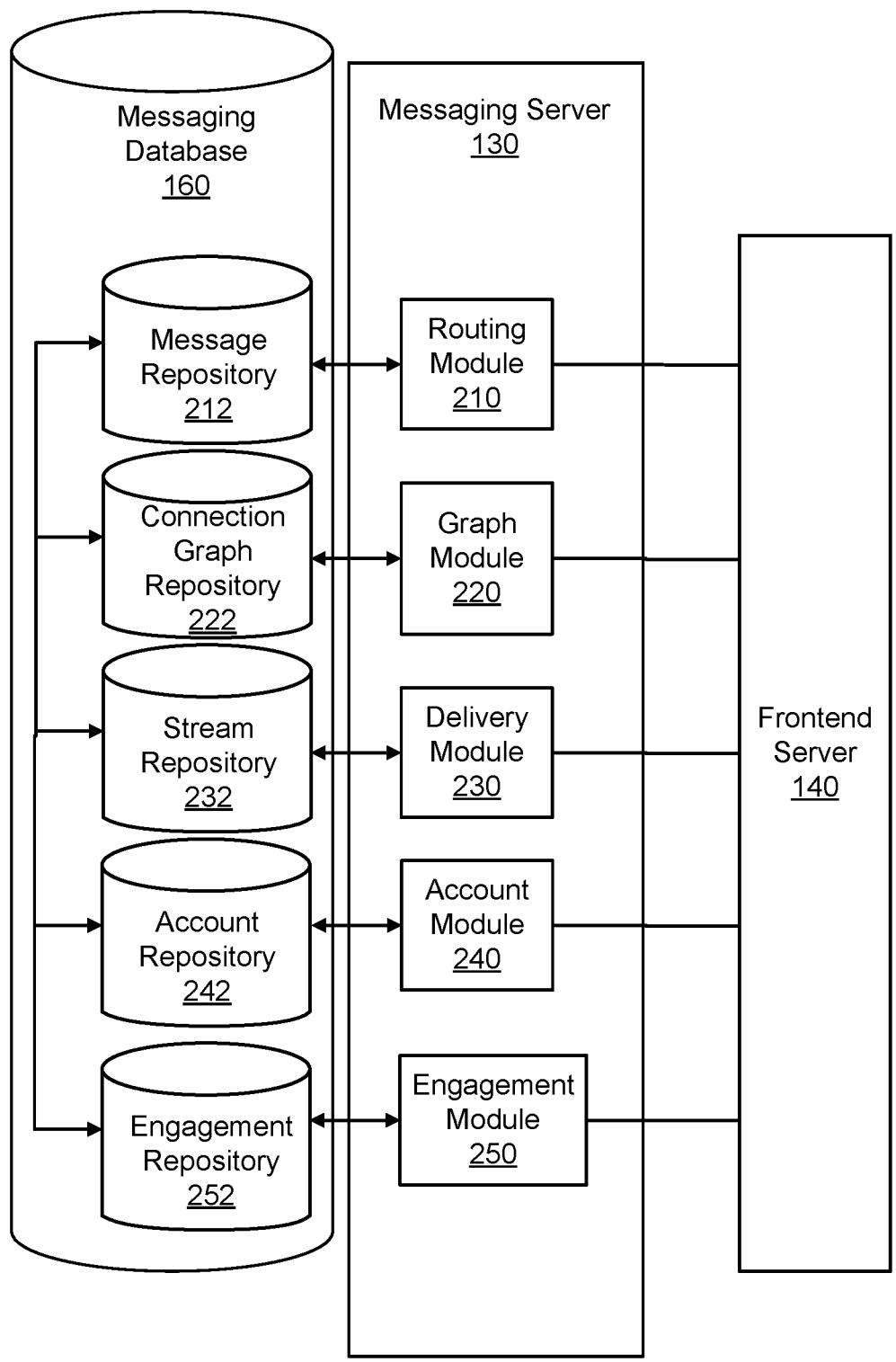
FIG. 2 illustrates the logical components of a messaging server, according to one embodiment.

FIG. 2 illustrates the logical components of a messaging server 130, according to one embodiment. Each messaging server 130 handles at least the basic messaging functionality of the messaging system. This basic functionality includes at least publishing new messages, providing message streams to be provided upon client request, managing accounts, managing connections between accounts, messages, and streams, and receiving engagement data from clients engaging with messages.

Each messaging server 130 includes a routing module 210, a graph fanout module 220, a delivery module 230, and an account module 240. Each messaging server 130 is communicatively coupled with an associated database 160 which stores data locally for convenient access by the associated messaging server 130. Each database 160 includes a message repository 212, a connection graph repository 222, a stream repository 232, an account repository 242, and an engagement repository 252.

In the messaging system, messages are containers for a variety of types of computer data representing content provided by the composer of the message. Types of data that may be stored in a message include text (e.g., 140 character Tweet), graphics, video, computer code (e.g., uniform resource locators (URLs)), or other content. Messages can also include key phrases (e.g., symbols, such as hashtag "#") that can aid in categorizing or contextualizing messages. Messages may also include additional metadata that may or may not be editable by the composing account holder, depending upon the implementation. Examples of message metadata include the time and date of authorship as well as the geographical location where the message was composed (e.g., the current physical location of the client 110). Messages are not only a representation of the written text, video, or audio media, but also a representation of that content captured within an electronic representation, and stored as data within a computing device.

The messages composed by one account holder may also reference other accounts. For example, a message may be composed in reply to another message composed by another account. Messages may also be repeats (or reposts) of a message composed by another account. Generally, an account referenced in a message may both appear as visible content in the message (e.g., the name of the account), and may also appear as metadata in the message. As a result, the messaging system is able to allow the referenced accounts to be interactive. For example, clients 110 may interact with account names that appear in their message stream to navigate to the message streams of those accounts. The messaging system also allows messages to be private, such that a composed message will only appear in the message streams of the composing and recipient accounts.

The routing module 210 stores newly composed messages received through the frontend module 110 in the message repository 212. In addition to storing the content of a message, the routing module 210 also stores an identifier for each message. The identifier provides a piece of information that can be used to identify that the message is to be included in a message stream. This allows the message to be stored only once, and accessed for a variety of different message streams without needing to store more than one copy of the message.

The graph module 220 manages connections between accounts, thereby determining which streams includes messages from which accounts. In one embodiment, the messaging system uses unidirectional connections between accounts (or streams) to allow account holders to subscribe to the message streams of other accounts. By using unidirectional connections, the messaging system allows an account holder to receive messages that appear in one of the streams of one of the other users, without necessarily implying any sort of reciprocal relationship the other way. For example, the messaging system allows account holder A to subscribe to the message stream of account holder B, and consequently account holder A is provided and can view the messages authored by account holder B. However, this unidirectional connection of A subscribing to B does not imply that account holder B can view the messages authored by account holder A. This could be the case if account holder B subscribed to the message stream of account holder A; however, this would require the establishment of another unidirectional connection. In one embodiment, an account holder who establishes a unidirectional connection to receive another account's message stream is referred to as a "follower", and the act of creating the unidirectional connection is referred to as "following" another account. The graph module 220 receives requests to create and delete unidirectional connections between accounts through the frontend module 140. These connections are stored for later use in the connection graph repository 222 as part of a unidirectional connection graph. Each connection in the connection graph repository 222 references an account in the account repository 242 or a stream in the stream repository 232.

In the same or a different embodiment, the graph module 220 manages connections between account using bidirectional connections. Upon establishing a bidirectional connection, both accounts are considered subscribed to each other's account message stream(s). The graph module stores bidirectional connections in the connection graph repository 222. In one embodiment, the messaging system and connection graph repository 222 include both unidirectional and bidirectional connections. Additionally, the connections (both unidirectional and bidirectional) are electronic representations of relationships between physical entities.

The delivery module 230 constructs message streams and provides them to requesting clients 110 through the frontend module 140. Responsive to a request for a stream, the delivery module 230 either constructs the stream in real time, or accesses some or all of a stream that has already been generated from the stream repository 232. The delivery module 230 stores generated streams in the stream repository 232. An account holder may request any of their own streams, or the streams of any other account that they are permitted to access based on security settings.

The messages included in a stream may have been authored by a connected account while both accounts are simultaneously accessing the messaging system. The messages included in a stream also include messages authored in the past by accounts that are not currently accessing the messaging system. As introduced above, the contents of a message stream for a requesting account holder may include messages composed by that account holder, messages composed by the other accounts that the requested account holder follows, and messages authored by other accounts that reference the requested account holder. The messages of a stream may be ordered chronologically by time and date of authorship, or reverse chronologically. Other orderings may also be used, such as according to their inferred relevance to the user, and customizations that reorder messages in order to deliberately inject variety in message content, take into account duration of message views by accounts, incorporate events triggered by user interactions with messages, and any combination of the above listed factors.

A stream has the potential to include a large number of messages. For both processing efficiency and the requesting account holder's viewing convenience, the delivery module 230 generally identifies a subset of possible messages for sending to the client 110 once the stream is generated. The remainder of the messages in the stream are maintained in the stream repository 232, and sent upon client 110 request.

The account module 240 provides functionality allowing an account holder to manage their account with the messaging system, and is one means for doing so. The account module 240 allows the account holder to manage privacy and security settings, as well as directly manage their connections to other users. Generally, the messaging system does not require the account holder to contribute a large amount of personal information. This personal information can include an account name (not necessarily a real name) or identifier (ID), provides pictures of media, provide a brief description of themselves/their entity, and a website. The personal information does not necessarily include traditional real-world identifying information such as age, gender, interests, history, occupation, etc. Provided information is stored in the account repository 242.

The message client software 112 allows account holders receiving a stream to engage (e.g., interact) with the messages in the stream. The engagement module 250 receives these engagements and stores them in the engagement repository 2525. There are a number of different types and categories of engagements. Types of engagement include clicking/selecting a message for more information regarding the message, clicking/selecting a URL (universal resource locator) or hashtag in a message, reposting the message, or favoriting a message. Other example engagements types include expanding a "card" (or compressed) message, which presents additional (uncompressed) content when an account holder engages with the card message. Account holders may engage further with content contained in the expanded card message (e.g., by playing a video or audio file or by voting in a poll). Some engagements are based on passive behavior by the account holder with respect to a stream or message appearing on the client device 110.

In addition to monitoring active interactions (e.g., engagements) with messages through explicitly received input at the client device 110 from the account holder, the engagement module 250 may also record passive interactions (e.g., impressions) with messages by accounts. An impression occurs when an account holder views or otherwise experiences the content of a message through a client 110. Impression engagements include the mere fact that an impression occurred, as well as other information such as whether a message in a stream appeared on a display of the client device 110, and how long the account holder dwelled on a message appearing on the display.

Any engagement stored in the engagement repository 252 may reference the messages, accounts, and/or stream involved in the engagement, for example via pointers to the message 212, account 242 and/or stream 232 repositories.

Engagements may also be categorized beyond their type. Example categories include engagements expressing a positive sentiment about a message (positive engagements), engagements expressing a negative sentiment about a message (negative engagements), engagements that allow an advertiser account to receive monetary compensation (monetizable engagements), engagements that are expected to result in additional future engagements (performance engagements), or connection engagements that are likely to result in one account holder following another account, etc. For example, the negative engagements category includes engagements such as dismissing a message or reporting a message as offensive while the positive engagements category typically includes engagements not in the negative engagements category. Example performance engagements include selecting a URL in a message or expanding a card. Example monetizable engagements include an engagement that results in an eventual purchase or a software application install to the client 110. Generally, categories and types are not coextensive, and a given type of engagement may fall into more than one category, and vice versa.

IV. Ranking Server

Using the messaging server 130 as described above, account holders can form connections with accounts, create streams of messages and engage with those messages. However, it can take significant time, effort, and knowledge of the messaging system for an account holder to create, curate, and manage a stream. As a result, new or inexperienced users of the messaging system miss out on the full feature set of the messaging system as a result of the barrier of entry of stream generation.

To alleviate this burden and make it easier for a new or inexperienced account holder to obtain a stream including an interesting and diverse set of messages, the messaging system includes a feature of automatically populating a stream of messages using only a seed selected by the requesting account holder. In one embodiment, the seed includes the streams of one or more of the "top" accounts of the messaging system. Here, "top" is according to any one of a number of different metrics, such as the number of followers of that account as stored in the connection graph repository 222, the number of engagements on that account's messages as stored by the engagement repository 252, and so on. With knowledge of the seed, the messaging system automatically populates a stream for the requesting account holder, without requiring any other input.

Figure 3:
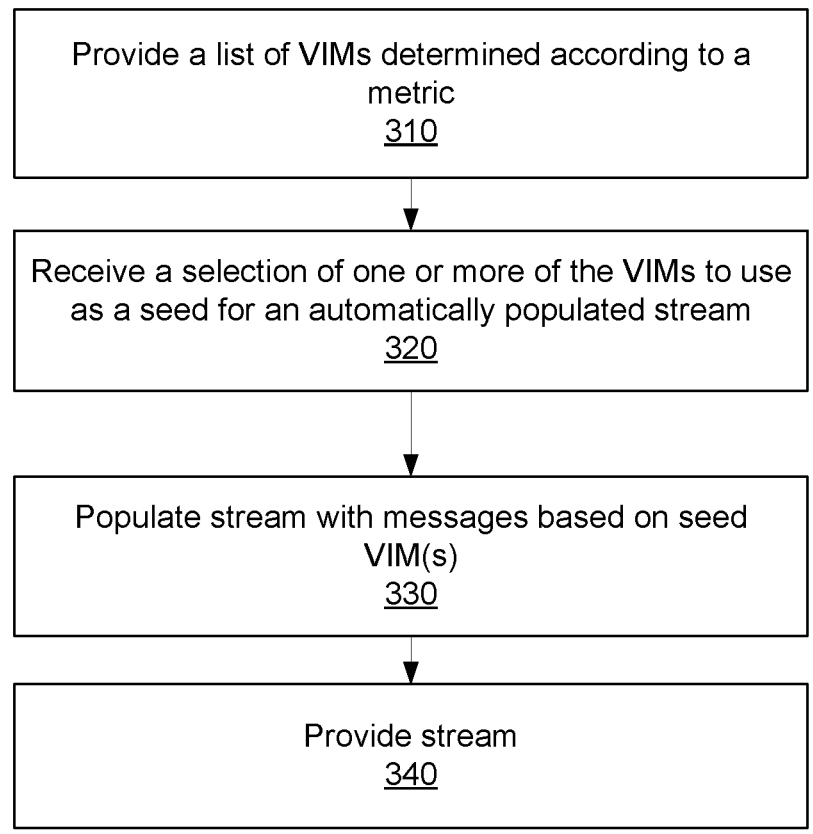
FIG. 3 is a flowchart of the steps for automatically populating a stream of messages for a requesting account holder, according to one embodiment.

FIG. 3 is a flowchart of the steps for automatically populating a stream of messages for a requesting account holder, according to one embodiment. The messaging system provides 310 a client 110 with a list of top accounts according to whatever metric(s) are deemed appropriate. These top accounts may also be referred to as very-important-messagers or VIMs and may be presented as such in the messaging system's client-side user interface 112 to highlight their prominence within the messaging system. Typically, the top VIMs are limited to small fraction of the total number of accounts in the messaging system. For example, the messaging system may specify that VIMs are the top 300,000 accounts according to a metric such as a number of followers within the messaging system. Alternatively, the messaging system provides the message stream of a VIM, and also provides the option to "see more accounts like this", whereupon the VIM is used as the seed if the user selects the option. The messaging system may also provide the user the opportunity to "see less from account like this", whereupon the VIM is removed from the seed or is used to negatively weight relevance scores (the opposite of relevance determinations below) if the user selects the option.

The messaging system receives 320 a selection of one or more of the listed VIMs to use as a seed for automatically populating the stream for the requesting account holder. Within the messaging system, a ranking server 170 populates 330 the stream with messages based on the seed VIM(s). The ranking server provides 340 the stream to the front end server 140 to send to the client 110.

The computing device components of the messaging system used to automatically populate streams including the ranking server 170 and the software functions of those computing devices are described in more detail immediately below.

V. Determining the Messages to Include in a Stream

Figure 4:
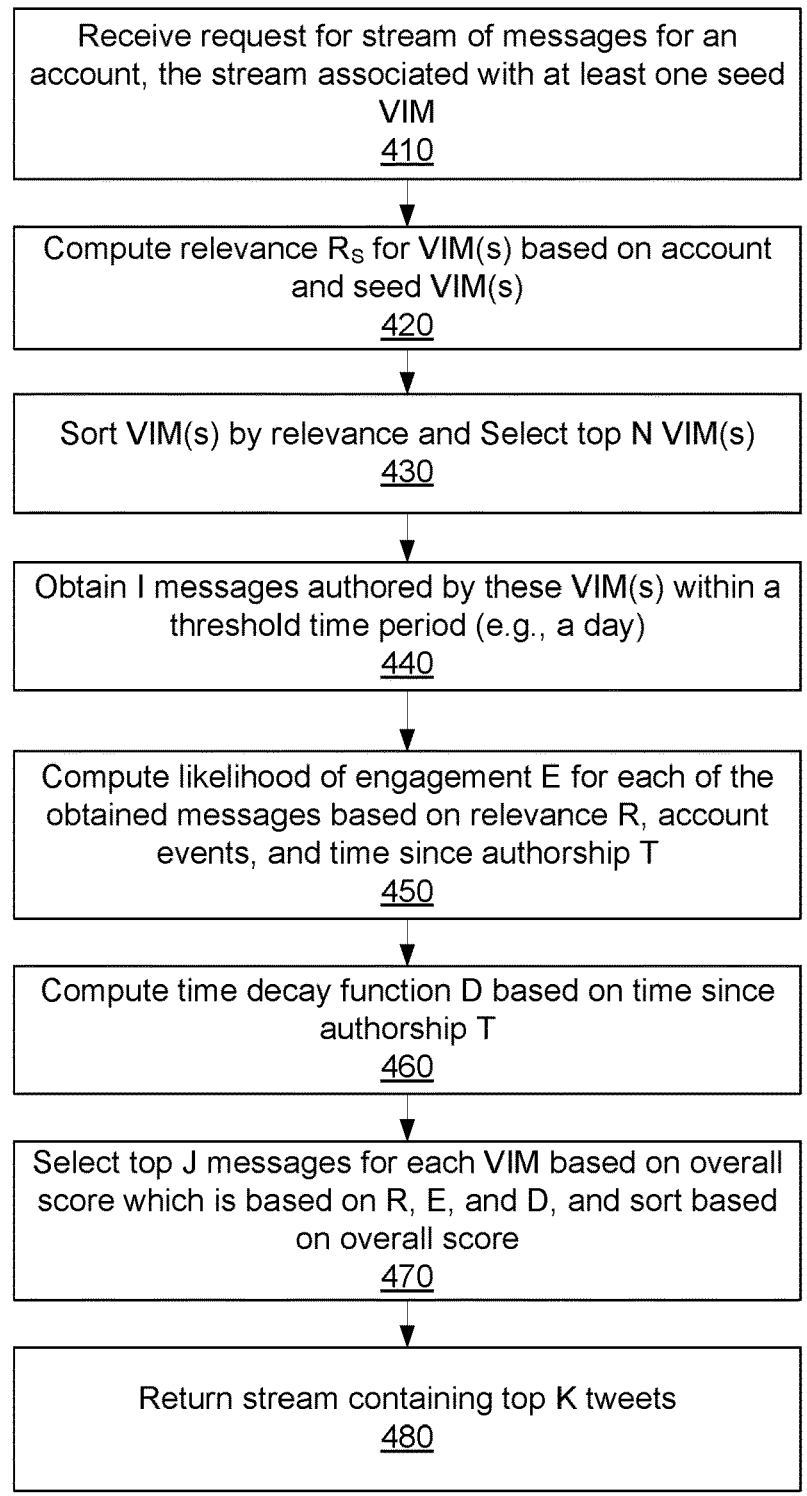
FIG. 4 is a flowchart of the steps for determining which messages to include in an automatically populated stream, according to one embodiment.

FIG. 4 is a flowchart of the steps for determining which messages to include in an automatically populated stream, according to one embodiment. The ranking server 170 receives 410 a request for a stream from the front end server 140. The request includes a seed selected by an account holder that includes one or more VIM(s) that are to be used as the basis for selecting which messages are to be included in the stream. In one embodiment, the list of seed VIM(s) is received by the ranking server 170 as a vector, as will be further described below.

The ranking server 170 ranks a number of messages (each identified by an index or identifier (ID) m) for possible inclusion in the stream according to one or more of a message relevance function $R_S$, an engagement rate function E, and a time decay function D. In one embodiment, the ranking server 170 ranks messages according to:

$$\text{Rank}(S,m) = R_S(S,\text{VIM}) \cdot E(R_S, F_m, T_m) \cdot D(T_m) \qquad (1)$$

where S is the stream where the message originated, VIM is the account that authored the message, $R_S$ is the relevance of the VIM who authored the message to the seed (as already determined by the relevance function $R_S$), $F_m$ is the number of positive engagements the message has received as stored in the engagement repository 252 (e.g., the number of favorites), and $T_m$ is the age of the message (i.e., the amount of time that has elapsed between authorship and the time the stream is requested). Note that the relevance function $R_S$ computes relevance on a per VIM basis, whereas the engagement R and time decay D functions are determined on a per message basis.

To populate the stream, the ranking server 170 is configured to draw upon the streams and messages of the entirety of the messaging system. As the messaging system may have many millions of accounts, streams, and connections, and upwards of billions of messages and engagements spread across numerous messaging server 130 instances and associated databases 160, the ranking server 170 is configured to access those servers 130 and database 160s and contend with that massive amount of data. In one embodiment, the ranking server 170 is located on one or more physically distinct computing devices separate from messaging server 130 instances and the frond end server 140 instances. To store information needed to rank and provide message streams, the ranking server 170 is also communicatively coupled with two separate databases, a high density file system (HDFS) database 180, and a fast access database 190. The functionality of these databases is described below.

In one embodiment, rather than computing message rank immediately, for example directly according to equation (1) above, the ranking server 170 instead first computes 420 the relevance $R_S$ for all VIMs (e.g., 300,000) in the system. The ranking server 170 ranks 430 the VIMs according to their relevance $R_S$, and selects the top N VIMs (e.g., 200) for further processing. The ranking server 170 uses the fetcher module 172 to obtain 440 I messages (e.g., 200) authored by the top N VIMs within a recent time period (e.g., within the last 24 hours). The ranking server 170 then proceeds to compute the rank for each message m, for example according to equation (1) above. This may include calculating an engagement score E 450 and a time decay score 460. Once the ranks of messages for the top N VIMs have been determined, the ranking server 170 sorts 470 the messages by their rank, without regard for which VIM they belong to. The ranking server 170 selects 470 a subset of the top J messages (e.g., 200) and returns 480 a subset of the top K messages (e.g., 30) for inclusion in the stream to be provided to the client 110, where K<J. This way, the client 110 is provided with a stream of relevant messages, in a manner that has a reduced chance of overtaxing the client's 110 network 120 connection. If the receiving account holder wishes to view more messages from the stream, they can request more messages, and the ranking server 170 can return more of the messages from the subset of K messages.

Calculating rank in this order saves a great deal of processing time. As relevance $R_S$ is computed on a per-VIM basis and engagement E and time decay D are computed on a per message m basis, merely using equation (1) to rank messages would be very inefficient, as the rank would be determined for messages authored by VIMs who were not very relevant, and thus were unlikely to ever be selected for inclusion in the stream. Instead, calculating the relevance of VIMs first and then only determining rank for the messages of the top N VIMs ensures that the ranks of messages for VIMs outside the top N VIMs by relevance are not determined. This also saves database space in terms of what messages are pulled from databases 160 for use by the ranking server 170, and what data is stored in the databases 180 and 190 associated with the ranking server 170.

Figure 5:
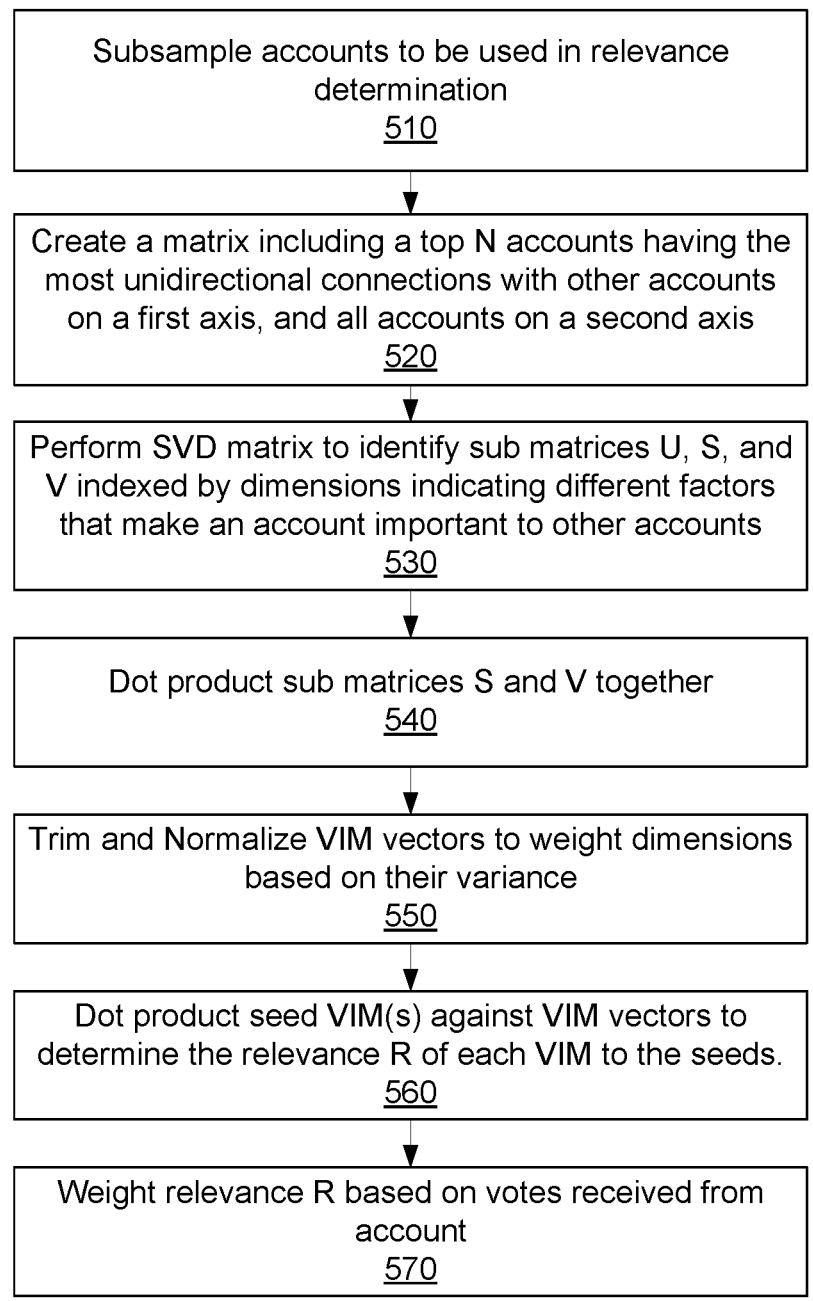
FIG. 5 is a flowchart of the steps for determining the relevance of a message to an automatically populated stream, according to one embodiment.

Particularly, determining which VIMs are relevant to a seed (step 420, and the subject of the entirety of the next section and FIG. 5) is a processing-intensive calculation. In order to make best use of this expended processing, once the relevance $R_S$ of each of the VIMs to the seed S has been determined, they are stored in the fast access database 190. Subsequently, these determinations of relevance $R_S$ for each VIM can be reused whenever the stream is requested. This may be useful in the short term, where the client 110 makes multiple requests for additional messages for the stream, for example by scrolling down in their browser 11. This may also be useful in the long term, as if a stream is not altered once the seed is chosen, the relevance of the seed to the other VIMs may also be assumed to be static for at least some period of time (e.g., an hour, a day, a week, a month) such that if the account holder logs out and then later logs in to the messaging system at a later date and requests the stream, the relevance calculation does not necessarily need to be re-performed on each subsequent login. Of course, relevance may be re-determined at any appropriate interval, or upon alteration of the seed.

V.A. Message Relevance Preprocessing

FIG. 5 is a flowchart of the steps for determining the relevance of a message to a stream, according to one embodiment. As introduced above, the ranking server 170 determines the relevance $R_S$ of the seed S selected by the client 110 to each of the VIMs. The relevance function $R_S$ uses the connection graph between accounts and VIMs to determine relevance. As above, there may be many millions of accounts and upwards of billions connections spread over multiple messaging server 130 instances and multiple databases 160 storing multiple connection graph repositories 222. As a result, the size of the dataset for analysis of relevance is large, in addition to being physically distributed.

To facilitate processing of this dataset, the ranking server 170 includes a fetcher module 172 that retrieves 510 the connection graphs from the connection graph repositories 222 of the various databases 160, and passes them to the preprocessing module 174 for processing as will be described later in this section. After pre-processing, the resulting dataset is stored in the HDFS database 180 for use by the ranking module 176 in ranking.

Robust determination of relevance $R_S$ does not require that every single account's connection be considered. Thus, only a percentage of the ordinary accounts across the entirety of all of the databases 160 are retrieved by the fetcher module 172. For example, if there are 57 million accounts, the fetcher module 172 may randomly sample 10% of accounts for retrieval. The fetcher module 172 is further able to reduce the amount of data that needs to be retrieved by only retrieving account connections associated with VIMs. To ensure that the resulting relevance calculation is representative of the entire population of accounts, the accounts used in the relevance determination are pulled from multiple different databases 160. As these databases may be distributed in different geographic locations, this ensures that the relevance determination takes into variations in connections in different countries and regions.

The preprocessing module 176 that takes the graph data retrieved by the fetcher module 172 and constructs a follow matrix F having accounts on a first axis (e.g., rows), and VIMs on another axis (e.g., columns). Using the examples above, if there are 57 million accounts and 300,000 VIMs, follow matrix F has dimensions of 5.7 million by 300,000. The value of each cell in the matrix is a binary value that depends on whether or not (e.g., 1 or 0 or vice versa) the account of a given row follows the account of that column, or vice versa. This is in direct contrast to existing collaborative filtering methods which use sparse stochastic gradient descent methods which instead treat 0 entries in a database as missing values, thus removing them from calculation entirely. By assigning these values as 0 and not missing, the preprocessing module 176 uses them in calculations, for example the singular value decomposition (SVD) described in the next paragraph.

The preprocessing module 176 uses SVD to identify the top A dimensions of F according to:

$$F = USV \quad (2)$$

Continuing with the example above, U is 5.7 million accounts by A dimensions (5,700,000×A), S is a diagonal matrix A×A, and V is A by 300,000 VIMs (A×300,000). The elements of S and V are the optimized linear encodings such that the dot product of a vector from U and a vector from V approximates, as best as possible based on the number of dimensions A used, the likelihood that the account represented by the row vector from U follows the VIM represented by the column vector from V. If two column vectors from V are multiplied, the result approximates, as best as is possible based on the number of dimensions A used, the likelihood that an account who follows one account would also follow the other account.

Depending upon the implementation, the number of dimension A may vary. Less dimensions gives a less robust determination of relevance at reduced processing cost, whereas more dimensions gives a more robust determination of relevance at increased processing cost. In one embodiment, the number of dimensions is anywhere between 100-500. In one specific embodiment, the number of dimensions is approximately 400. In an alternate embodiment, rather than using SVD, distributed factorization methods may be used; however their processing cost can be prohibitively expensive for the ranking server 170's processing power when the number of dimensions is in the 100-500 range.

Consider an example implementation where there are 5 dimensions (A=5), and four VIMs under consideration, the account of "Katy Perry", the account of "Anderson Cooper", the account of the "New York Times", and the account of "EPSN". Example S and V matrices are as follows:

$$S = \begin{bmatrix} 3975.8 & 0 & 0 & 0 & 0 \\ 0 & 2313.6 & 0 & 0 & 0 \\ 0 & 0 & 2197.9 & 0 & 0 \\ 0 & 0 & 0 & 1956.4 & 0 \\ 0 & 0 & 0 & 0 & 1883.5 \end{bmatrix} \quad (3)$$

$$V^T = \begin{bmatrix} .13689 & .046482 & .0027021 & .051209 & -.01926 \\ .033927 & -.054845 & .02485 & .010889 & -.042071 \\ .036493 & -.058646 & .035148 & -.0033025 & -.056302 \\ .038968 & -.071947 & .011062 & -.0013589 & .011608 \end{bmatrix} \quad (4)$$

where each row of V is represents the values of the dimensions for that VIM. For example, for the VIM Katy Perry, the dimensions 1-5 have values according to:

$$V_{Katy\ Perry}^T = [0.13689\ 0.046482\ 0.0027021\ 0.051209 - 0.01926] \quad (5)$$

The preprocessing module 176 computes a combination of S and V to create 540 a VIMVectors matrix. In one embodiment, the calculation is computed by computing the dot product between S and V according to:

$$VIMVectors = (S \cdot V)^T \quad (6)$$

$$VIMVectors = \begin{bmatrix} 544.25 & 107.54 & 5.9387 & 100.18 & -36.277 \\ 134.89 & -126.89 & 54.617 & 21.304 & -79.241 \\ 145.09 & -135.68 & 77.251 & -6.4611 & -106.05 \\ 154.93 & -166.46 & 24.312 & -2.6585 & 21.863 \end{bmatrix} \quad (7)$$

where each row of VIMVectors may be referred to as a feature vector. For example, when two VIMs both have large positive or large negative values in the same dimension, it is an indication that the two VIMs are interesting to the same types of users.

In one embodiment, the preprocessing module 176 trims 550 the VIMVector matrix by removing the first column. The first column of the VIMVector matrix merely represents the number of follows each VIM has, and consequently keeping the first column increases processing time while also decreasing the quality of resulting calculations. In an alternate embodiment, VIMVectors matrix can be created without the first column, thus removing the step of removing it later. Without the first column VIMVectors is:

$$VIMVectors = \begin{bmatrix} 107.54 & 5.9387 & 100.18 & -36.277 \\ -126.89 & 54.617 & 21.304 & -79.241 \\ -135.68 & 77.251 & -6.4611 & -106.05 \\ -166.46 & 24.312 & -2.6585 & 21.863 \end{bmatrix} \quad (8)$$

The preprocessing module 176 also normalizes 550 VIMVectors by row according to:

$$VIMVectors_i = \frac{VIMVectors(i)}{|VIMVectors(i)|} \quad (9)$$

$$VIMVectors = \begin{bmatrix} 0.709823 & 0.0392 & 0.66127 & -0.23944 \\ -0.78972 & 0.33992 & 0.13258 & -0.49317 \\ -0.71846 & 0.40906 & -0.03421 & -0.56152 \\ -0.98113 & 0.14331 & -0.01567 & 0.12887 \end{bmatrix} \quad (10)$$

Normalizing in this manner weights the remaining dimensions according to their variance. This helps keep the more subtle or VIM-specific dimension (e.g., dimensions that are only major factors in a few of the VIMs) from overpowering the larger, more broad dimensions (e.g., dimensions that are factors in many of the VIMs) in the relevance determination.

After creation, the preprocessing module 176 stores the VIMVectors matrix in the HDFS database 180. As the VIMVectors matrix is not based on the seed S, it is equally applicable to all relevance determinations for all streams. Thus, it can be generated and updated asynchronously from the remainder of the relevance projects. By pre-generating it, storing it in the HDFS database 180, and accessing when needed, the overall processing requirement of the relevance determination is reduced for all seeds.

V.B. Message Relevance Determination

The ranking module 176 uses the VIMVectors matrix stored in the HDFS database 180 and the seed VIMs to determine the messages to include in the stream. As discussed above, the seed VIMs represent an election received from the client 110 regarding which VIMs they want their message stream to be similar to. If the seed is a single VIM, then the seed effectively represents that they want the message stream to include messages similar to those that appear in the selected VIM's message stream. If the seed is more than one VIM, then the seed effectively represents that they want the message stream to include messages similar to those that appear in the selected VIMs' message streams. The ranking module 176 uses the seeds to identify messages that meet those criteria to within some threshold "breadth." In this way, the ranking module 176 populates a stream of messages that appear similar to, but not identical to, the messages from the selected seed VIM(s). The ranking module 176 can either internally control or allow the client 110 to control "breadth" to control how similar to (or how not similar to) the messages populated in the stream match the messages from the seed VIM(s).

In the case of a single seed VIM, the ranking module 176 obtains the vector from the VIMVector matrix corresponding to that VIM. This vector is referred to as the seed vector S. Continuing with the example above, assume the seed VIM selected by the client is for the VIM the New York Times. Seed vector $S_{New\ York\ Times}$ is thus the third row of VIMVectors:

$$S_{New\ York\ Times} = [-0.71846\ 0.40906 - 0.03421 - 0.56152] \quad (11)$$

To determine the relevance $R_S$ of each other VIM to the seed vector, the ranking module 176 computes 560 a function that combines the seed vector and the VIMVector for that VIM. In one embodiment, this combination is a dot product between the seed vector and all other VIM vectors from the VIMVector matrix according to:

$$R_S(S, VIM_i) = \text{sign}(S \cdot VIM_i) \cdot |S \cdot VIM_i|^\alpha \quad (12)$$

Here, nonlinear scaling is provided by a factor α, which determines the "breadth" of the relevance calculation. Higher values of α will skew $R_S$ such that the dot product between similar vectors (i.e., between S and $VIM_i$) will have significantly larger values than the dot product between non-similar vectors. This effectively results in a "narrower" relevance determination, meaning that fewer VIMs will be found to be similar to the seed vector, thereby narrowing the pool of VIMs from which messages are selected for inclusion in the message stream. Conversely, lower values of α will skew $R_S$ such that the dot product between similar vectors will not have significantly larger values than the dot product between non-similar vectors. This effectively results in a "broader" relevance determination, meaning that more VIMs will be found similar to the seed vector, thereby broadening the pool of VIMs from which messages are selected for inclusion in the message stream. Using the example above, $$R_S(S_{New\ York\ Times}, VIM_i) = \text{sign}(S_{New\ York\ Times} \cdot VIM_i) \cdot |S_{New\ York\ Times} \cdot VIM_i|^\alpha \quad (13)$$

results in the following relevances $R_S$ between the other example VIMs:

$$R_S(S_{New\ York\ Times}, VIM_{Katy\ Perry}) = -0.38212 \quad (14)$$

$$R_S(S_{New\ York\ Times}, VIM_{Anderson\ Cooper}) = 0.978825 \quad (15)$$

$$R_S(S_{New\ York\ Times}, VIM_{The\ New\ York\ Times}) = 1 \quad (16)$$

$$R_S(S_{New\ York\ Times}, VIM_{ESPN}) = 0.691699 \quad (17)$$

As above, the relevance $R_S$ between the seed S and some or all of the VIMs is stored in the fast access database 190. As introduced above, as there may be many VIMs (e.g., 300,000), performing several hundred dot products against many dimensions (e.g., 100-500) is extremely processing intensive. Thus, by storing $R_S$ in the fast access database 190 and reusing it, the processing burden of the $R_S$ calculation may be reduced. The relevance $R_S$ for each VIM may be returned for use in the overall rank determination as described above with respect to FIG. 4.

In the case where there are multiple VIMs included in the seed, the seed vector S is the sum of the individual vectors from the VIMVector matrix, which are then normalized to unit length 1. Consider an example seed listing the VIMs the New York Times (i=3) and ESPN (i=4). The seed vector $S_{Multiple}$ and its normalization $S^N_{Multiple}$ is thus:

$$S_{Multiple} = S_{New\ York\ Times} + S_{ESPN} \quad (18)$$

$$S_{Multiple} = [-1.69959\ 0.552367\ -0.04988\ -0.43265] \quad (19)$$

$$S_{Multiple} = [-0.92399\ 0.300297\ -0.02712\ -0.23521] \quad (20)$$

Seeds VIMs can also be specified that indicate content the user does not want to see, in which case rather than being positively added to the seed vector $S_{Multiple}$ as in equation (18) above, they are instead subtracted from the total (e.g., $-S_{ESPN}$ instead of $+S_{ESPN}$).

The ranking module's 176 relevance calculation 560 is the same as for a single seed VIM. Thus, relevance $R_S$ is determined according to:

$$R_S(S^N_{Multiple}, VIM_i) = \text{sign}(S^N_{Multiple} \cdot VIM_i) \cdot |S^N_{Multiple} \cdot VIM_i|^\alpha \quad (21)$$

with the following values when α=6:

$$R_S(S^N_{Multiple}, VIM_{Katy\ Perry}) = --0.04938 \quad (22)$$

$$R_S(S^N_{Multiple}, VIM_{Anderson\ Cooper}) = 0.708471 \quad (23)$$

$$R_S(S^N_{Multiple}, VIM_{The\ New\ York\ Times}) = 0.605173 \quad (24)$$

$$R_S(S^N_{Multiple}, VIM_{ESPN}) = 0.605173 \quad (25)$$

V.B.i. Voting to Adjust Relevance

Once the account holder requesting the stream has received the stream as automatically populated by the messaging system, they may determine that they have affinity for some of the messages, or are not interested in others of the messages. The message client software 112 allows the account holder to input these affinities on an account or message basis. The client 110 then forwards this input through the front end server 140, which provides it to the ranking server 170 for consideration in the relevance determination.

The ranking module 176 aggregates the indications of affinity by VIM and adjusts the relevance $R_S$ for that VIM accordingly. In one embodiment, given a set of votes V, the ranking module 176 tallies each vote v as either an indication of affinity having a positive value $d_v = +1$ (where d stands for the direction of the affinity), or as an indication of disinterest having a negative value $d_v = -1$. In one embodiment, the ranking module 176 weights 570 the VIMs based on the votes according to:

$$R(S, VIM_i) = R_S(S, VIM_i) + w\Sigma_{v \in V}[d_v \cdot \text{sign}(VIM_v \cdot VIM_i) \cdot |VIM_v \cdot VIM_i|^\mu] \quad (26)$$

The scaling factor μ performs a function similar to alpha in equation 12 above, in that it determines how broad or narrow the relevance function is with respect to votes, particularly for voted-on VIMs vs. VIMs that have not been voted on. A comparatively higher value for μ will more strongly bias the relevance function towards or away from voted-on VIMs relative to VIMs that have not been voted on. This affects the resulting likelihood that messages from voted on VIMs will appear in the message stream relative to VIMs that have not been voted on (or have been voted on less). The constant w controls the relative mix in the relevance determination between voting and VIM similarity to the seed. In one embodiment, μ is 10, and w=0.1.

FIG. 5 depicts that voting is incorporated into the relevance determination at step 570 after the other steps have been performed, however in practice voting may be incorporated at step 560, or earlier in the process, such as immediately after VIMVectors and the seed have been retrieved.

V.B.ii. Alternate Stream Creation Mechanism

Although a stream can be created using only a single VIM or only a few VIMs as a seed, the resulting stream can in some instances be "noisy" in that the messages included in the stream are significantly different from each other. This can be at least partially attributed to the ranking function, as well as the seed's reliance on the dimensions of only a single or few VIM(s) to determine which messages are included in the stream. To prevent this, in one implementation, the ranking server 170 is configured to add additional VIMs to the seed which have not been explicitly selected by the requesting account holder prior to performing the relevance determination of step 560.

Figure 6:
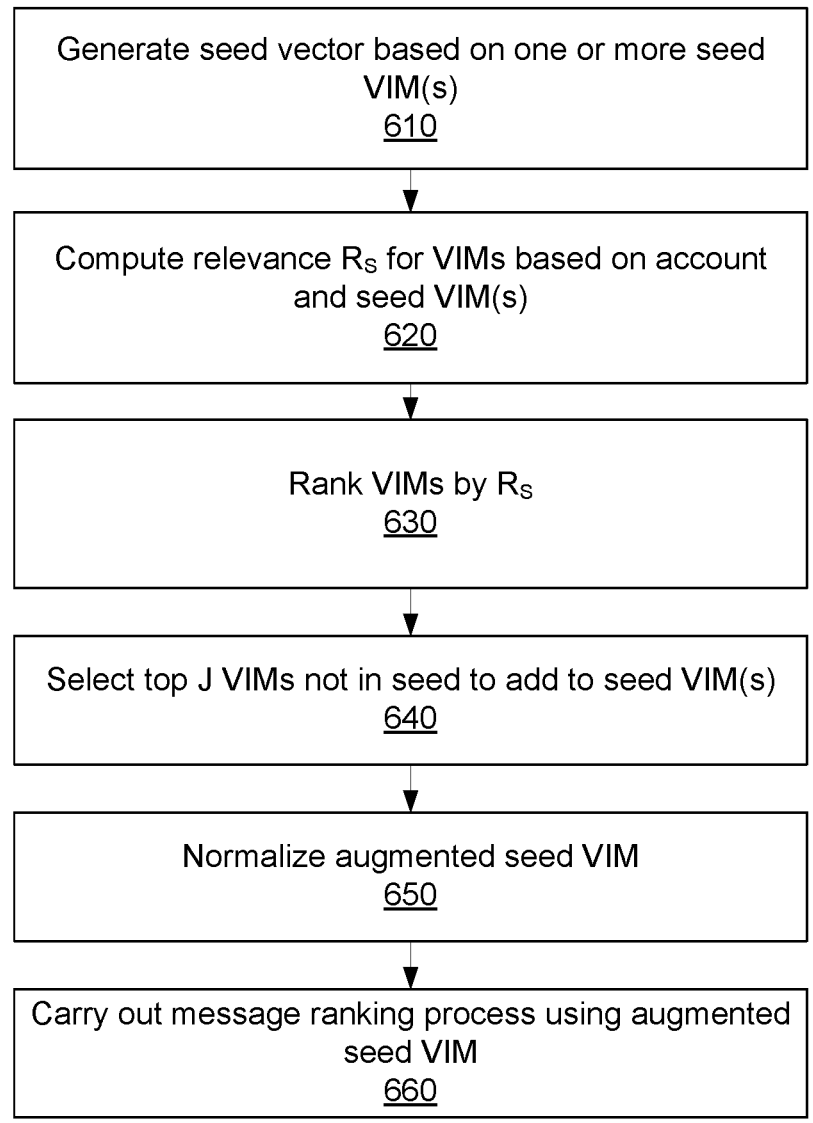
FIG. 6 is a flowchart of the steps for augmenting a set of seed VIMs provided by a client to decrease stream noise, according to one embodiment.

FIG. 6 is a flowchart of the steps for augmenting a set of seed VIMs provided by a client to decrease stream noise, according to one embodiment. In practice, the process of FIG. 6 can be interposed between steps 550 and 560 of the process of FIG. 5; this is after VIMVectors has been retrieved from the HDFS database 180 but before $R_S$ has been determined.

The ranking server 170 receives one or more seed VIMs from a client 110. The ranking module 176 generates 610 a normalized seed vector S (e.g., $S_{New\ York\ Times}$, $S^N_{Multiple}$) as described with respect to FIG. 5 above. The ranking module 176 determines 620 the relevance $R_S$ for each of the VIMs in the messaging system with respect to the seed vector S. For example, $R_S$ may be determined according to the process described with respect to FIG. 5 above. The ranking module 176 then ranks 630 the VIMs according to their relevance $R_S$ to the seed vector S. The ranking module 176 selects 640 the top J (e.g., J=5) ranked VIMs and adds them to the seed vector S to generate an augmented seed vector S'. The ranking module 176 selects only VIMs that are not already part of the seed vector in order to avoid double-counting a VIM. The ranking module 176 then normalizes the augmented seed vector S' as described above for the example $S^N_{Multiple}$. The ranking module 176 then performs the remainder of the ranking and message selection processes described in FIGS. 3-5 using the augmented seed vector S' in place of the original seed vector S.

V.C. Likelihood of Engagement

As introduced above, the rank of a message is at least partially based on the likelihood that someone viewing the message stream will engage with the message. The likelihood that a given message will receive an engagement from an account can be determined using any type or category of engagement stored in the engagement repositories 252. In one embodiment, the ranking module 176 determines the likelihood of engagement E based on the relevance of the VIM who authored the message to the seed $R_S$ as calculated above, the time that has elapsed since the message was authored $T_m$, and based on the number of engagements $F_m$ the message has already received since being authored. For example, in one specific embodiment likelihood of engagement E is computed according to $$E(R_s, F_m, T_m) = \log\left(1 + \frac{1 + F_m + R_s}{2 + T_m}\right) \quad (27)$$

This function for likelihood of engagement E is biased towards newer messages because it has been determined that in practice engagement rate naturally falls off as messages get older. Additional scaling and smoothing may be added depending upon the implementation. Generally, the likelihood of engagement function E may be based on any type or category of engagement information stored in the engagement repository 252.

In order to determine likelihood of engagement E, the ranking server 170 uses the fetcher module 172 to obtain data from the databases 160 that store information for messages under consideration. The obtained information includes the message IDs, the account information identifying who authored the messages, and the time of authorship, all of which are stored in the message repository 212 and/or in the account repository 242. The obtained information also includes engagement information stored in the engagement repository 252. The fetcher module 172 obtains the data from databases 160 for the messages in consideration and stores it in the databases 160. In one embodiment, rather than obtaining all engagements relating to each message, the fetcher module 172 is configured to obtain only positive engagements (e.g., engagements expressing a positive sentiment towards the message). As the ranking module 176 wants to include only messages of interest to recipient, obtaining and considering only positive engagements in the calculation of likelihood of engagement, E, facilitates that purpose.

V.D. Time Decay Value

As introduced above, the rank of a message is at least partially based on the time that has elapsed since the message was authored. This factor is referred to as the time decay value D. The time decay value, D, is larger the less time that has elapsed since the message was authored. In one embodiment, the time decay value D is calculated according to:

$$D(T_m) = e^{-\lambda \cdot T_m} \quad (28)$$

although there are other possible functions may also be used. The parameter λ affects how quickly the time decay value D falls off as time elapses since authorship, and in one embodiment is equal to 0.5.

In an implementation where both the likelihood of engagement E and the time decay value D are used to determine rank, the time decay value D provides a separately tunable mechanism for affecting the ranking of a message based on time without having to manipulate the engagement rate function directly. Further, the time decay value function $D(T_m)$, and specifically the parameter λ, can be adjusted dynamically. For example, if a request is received from a client 110 to refresh the stream and obtain new messages, λ can be increased to a significantly higher value (e.g., 3) for the duration of the request to more heavily bias towards recently authored messages vs. messages that were authored earlier in time.

VI. Additional Considerations

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

It will be understood that the named components represent one embodiment, and other embodiments may include other components. In addition, other embodiments may lack the components described herein and/or distribute the described functionality among the components in a different manner. Additionally, the functionalities attributed to more than one component can be incorporated into a single component.

As noted above, the computing devices described in FIGS. 1 and 2 include a number of "modules," which refers to computational logic for providing the specified functionality. A module is implemented in software that operates on at least one computing device. Each module can be implemented as a standalone software program, but can also be implemented through other means, for example as part of a larger program, as a plurality of separate programs, or as one or more statically or dynamically linked libraries. In any of these software implementations, the modules are stored on the computer readable persistent storage devices of the computing device(s) within which they are located, loaded into memory, and executed by one or more processors (generally, "a processor") of the computing device. The various data processing operations described herein are sufficiently complex and time consuming as to require the operation of a computing device, and cannot be performed merely by mental steps.

Embodiments described may also relate to an apparatus for performing the operations herein. This apparatus is specially constructed for the purpose described herein, owing to the large number of accounts, messages, streams, and related content (e.g., engagements) that are processed by the messaging system generally, and which are processed by the ranking server 170 specifically. The tasks carried out by the ranking server 170 may be persistently stored in a non-transitory, tangible computer readable storage medium, or any type of media suitable for storing electronic instructions, which may be coupled to a computer system bus within the ranking server 170. Furthermore, any of the computing devices referred to in the specification may include a single processor or may be architectures employing multiple processor designs for increased computing capability. Embodiments of the invention may also relate to a product that is produced by a process described herein. Such a product may comprise information resulting from a computing process, where the information is stored on a non-transitory, tangible computer readable storage medium and may include any embodiment of a computer program product or other data combination described herein. An example of such a product is the automatically populated message stream generated by the ranking server 170 that is provided to the client 110 responsive to a client request.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments described is intended to be illustrative, but not limiting, of the scope of what is protectable, which is set forth in the following claims.

What is claimed is:

1. A method performed by a messaging system for automatically populating a stream of messages for a user, the method comprising:
   providing, by the messaging system and to a client device, for presentation to and selection by a user of the client device, multiple system-selected accounts, the multiple system-selected accounts being accounts selected by the messaging system, wherein the accounts of the messaging system include first accounts, and the system-selected accounts are selected from among the first accounts;
   receiving, by the messaging system, a request for content from the user of the client device, the request specifying two or more user-selected accounts, a user-selected account being an account selected by the user from among the multiple system-selected accounts provided by the messaging system to the client device;
   obtaining, for each of the two or more user-selected accounts, a respective feature vector, each respective feature vector representing those first accounts to which the user-selected account is interesting, wherein the respective feature vector is a vector of real numbers;
   generating, by the messaging system, a seed vector, comprising summing the respective feature vectors for each of the two or more user-selected accounts;
   determining, for each first account, a respective measure of relevance of the first account to the user based on a measure of similarity between a respective feature vector for the first account and the seed vector; and
   providing, by the messaging system and to the client device, a response to the request, wherein the response includes messages authored by first accounts in a ranked order according to a ranking score of each message, wherein the ranking score of each message is computed as a function of at least the determined measure of relevance of the first account that authored the message.

2. The method of claim 1, wherein each of the first accounts is a top account, wherein top accounts are accounts that are top when measured by numbers of followers or when measured by numbers of engagements on messages by the accounts.

3. The method of claim 2, comprising obtaining, for each of the first accounts, a respective feature vector by:
   generating a follow matrix F of dimension N×T in which element (i,j) is a binary value that indicates whether the i-th account is followed by the j-th account, wherein each i-th account is one of N accounts of the messaging system, the messaging system has T top accounts and N>T, and each j-th account is one of T top accounts;
   factoring the follow matrix F into a matrix product UΣV, where U is an N×A matrix, Σ is a diagonal A×A matrix, and V is an A×T matrix, wherein A is a predetermined number less than or equal to a total number of features for each top account; and
   generating the respective feature vector as a respective row vector of a matrix $M=(\Sigma \cdot V)^T$ corresponding to the top account.

4. The method of claim 3, wherein generating, for each first account, the respective feature vector defining one or more respective features of the first account further comprises normalizing the row vectors of the matrix M in accordance with a computed variance for values of the row vectors.

5. The method of claim 1,
   wherein each of the respective feature vectors is a vector of real numbers having as many elements as the number of first accounts; and
   wherein the measure of similarity between two feature vectors is computed from a dot product between the vectors.

6. The method of claim 1, wherein the content is a stream of messages, and wherein providing the messages comprises providing the messages in the ranked order as the stream of messages for display on the client device, wherein higher ranked messages are displayed before lower ranked messages.

7. The method of claim 1, wherein the ranking score for each message is computed as a function of the determined measure of relevance of the account that authored the message, a measure of engagement with the message, and an age of the message.

8. A system comprising:
   one or more computers and one or more storage devices on which are stored instructions that are operable, when executed by the one or more computers, to cause the one or more computers to perform operations performed by a messaging system for automatically populating a stream of messages for a user, the operations comprising:
   providing, by the messaging system and to a client device, for presentation to and selection by a user of the client device, multiple system-selected accounts, the multiple system-selected accounts being accounts selected by the messaging system, wherein the accounts of the messaging system include first accounts, and the system-selected accounts are selected from among the first accounts;
   receiving, by the messaging system, a request for content from the user of the client device, the request specifying two or more user-selected accounts, a user-selected account being an account selected by the user from among the multiple system-selected accounts provided by the messaging system to the client device;

obtaining, for each of the two or more user-selected accounts, a respective feature vector, each respective feature vector representing those first accounts to which the user-selected account is interesting, wherein the respective feature vector is a vector of real numbers;
generating, by the messaging system, a seed vector, comprising summing the respective feature vectors for each of the two or more user-selected accounts;
determining, for each first account, a respective measure of relevance of the first account to the user based on a measure of similarity between a respective feature vector for the first account and the seed vector; and
providing, by the messaging system and to the client device, a response to the request, wherein the response includes messages authored by first accounts in a ranked order according to a ranking score of each message, wherein the ranking score of each message is computed as a function of at least the determined measure of relevance of the first account that authored the message.

9. The system of claim 8, wherein each of the first accounts is a top account, wherein top accounts are accounts that are top when measured by numbers of followers or when measured by numbers of engagements on messages by the accounts.

10. The system of claim 9, comprising obtaining, for each of the first accounts, a respective feature vector by:
generating a follow matrix F of dimension N×T in which element (i,j) is a binary value that indicates whether the i-th account is followed by the j-th account, wherein each i-th account is one of N accounts of the messaging system, the messaging system has T top accounts and N>T, and each j-th account is one of T top accounts;
factoring the follow matrix F into a matrix product UΣV, where U is an N×A matrix, Σ is a diagonal A×A matrix, and V is an A×T matrix, wherein A is a predetermined number less than or equal to a total number of features for each top account; and
generating the respective feature vector as a respective row vector of a matrix $M=(\Sigma \cdot V)^T$ corresponding to the top account.

11. The system of claim 10, wherein obtaining, for each first account, the respective feature vector defining one or more respective features of the first account further comprises normalizing the row vectors of the matrix M in accordance with a computed variance for values of the row vectors.

12. The system of claim 8,
wherein each of the respective feature vectors is a vector of real numbers having as many elements as the number of first accounts; and
wherein the measure of similarity between two feature vectors is computed from a dot product between the vectors.

13. The system of claim 8, wherein the content is a stream of messages, and wherein providing the messages comprises providing the messages in the ranked order as the stream of messages for display on the client device, wherein higher ranked messages are displayed before lower ranked messages.

14. The system of claim 8, wherein the ranking score for each message is computed as a function of the determined measure of relevance of the account that authored the message, a measure of engagement with the message, and an age of the message.

15. One or more non-transitory computer-readable storage media encoded with instructions that, when executed by one or more computers, cause the one or more computers to perform operations comprising:
providing, by a messaging system and to a client device, for presentation to and selection by a user of the client device, multiple system-selected accounts, the multiple system-selected accounts being accounts selected by the messaging system, wherein the accounts of the messaging system include first accounts, and the system-selected accounts are selected from among the first accounts;
receiving, by the messaging system, a request for content from the user of the client device, the request specifying two or more user-selected accounts, a user-selected account being an account selected by the user from among the multiple system-selected accounts provided by the messaging system to the client device;
obtaining, for each of the two or more user-selected accounts, a respective feature vector, each respective feature vector representing those first accounts to which the user-selected account is interesting, wherein the respective feature vector is a vector of real numbers;
generating, by the messaging system, a seed vector, comprising summing the respective feature vectors for each of the two or more user-selected accounts;
determining, for each first account, a respective measure of relevance of the first account to the user based on a measure of similarity between a respective feature vector for the first account and the seed vector; and
providing, by the messaging system and to the client device, a response to the request, wherein the response includes messages authored by first accounts in a ranked order according to a ranking score of each message, wherein the ranking score of each message is computed as a function of at least the determined measure of relevance of the first account that authored the message.

16. The computer-readable media of claim 15, wherein each of the first accounts is a top account, wherein top accounts are accounts that are top when measured by numbers of followers or when measured by numbers of engagements on messages by the accounts.

17. The computer-readable media of claim 16, comprising obtaining, for each of the first accounts, a respective feature vector by:
generating a follow matrix F of dimension N×T in which element (i,j) is a binary value that indicates whether the i-th account is followed by the j-th account, wherein each i-th account is one of N accounts of the messaging system, the messaging system has T top accounts and N>T, and each j-th account is one of T top accounts;
factoring the follow matrix F into a matrix product UΣV, where U is an N×A matrix, Σ is a diagonal A×A matrix, and V is an A×T matrix, wherein A is a predetermined number less than or equal to a total number of features for each top account; and
generating the respective feature vector as a respective row vector of a matrix $M=(\Sigma \cdot V)^T$ corresponding to the top account.

18. The computer-readable media of claim 17, wherein obtaining, for each first account, the respective feature vector defining one or more respective features of the first account further comprises normalizing the row vectors of the matrix M in accordance with a computed variance for values of the row vectors.

19. The computer-readable media of claim 15,
wherein each of the respective feature vectors is a vector of real numbers having as many elements as the number of accounts in the plurality of accounts; and
wherein the measure of similarity between two feature vectors is computed from a dot product between the vectors.

20. The computer-readable media of claim 15, wherein the content is a stream of messages, and wherein providing the messages comprises providing the messages in the ranked order as the stream of messages for display on the client device, wherein higher ranked messages are displayed before lower ranked messages.

21. The computer-readable media of claim 15, wherein the ranking score for each message is computed as a function of the determined measure of relevance of the account that authored the message, a measure of engagement with the message, and an age of the message.

* * * * *